(12) United States Patent
Ishikawa et al.

(10) Patent No.: US 11,100,792 B2
(45) Date of Patent: Aug. 24, 2021

(54) OBSTACLE DETERMINATION SYSTEM AND OBSTACLE DETERMINATION PROGRAM

(71) Applicants: AISIN AW CO., LTD., Anjo (JP); TOYOTA JIDOSHA KABUSHIKI KAISHA, Toyota (JP)

(72) Inventors: Ken Ishikawa, Nagakute (JP); Yasuyuki Kusumoto, Toyota (JP); Kento Nagashima, Toyota (JP)

(73) Assignees: AISIN CORPORATION, Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 58 days.

(21) Appl. No.: 16/349,425

(22) PCT Filed: Oct. 18, 2017

(86) PCT No.: PCT/JP2017/037661
§ 371 (c)(1),
(2) Date: May 13, 2019

(87) PCT Pub. No.: WO2018/110074
PCT Pub. Date: Jun. 21, 2018

(65) Prior Publication Data
US 2019/0287389 A1   Sep. 19, 2019

(30) Foreign Application Priority Data
Dec. 13, 2016   (JP) .............................. JP2016-241280

(51) Int. Cl.
*G06T 7/20* (2017.01)
*G08G 1/01* (2006.01)
(Continued)

(52) U.S. Cl.
CPC ....... *G08G 1/0112* (2013.01); *G06K 9/00805* (2013.01); *G08G 1/00* (2013.01); *G08G 1/09* (2013.01); *G08G 1/16* (2013.01)

(58) Field of Classification Search
CPC ........... G06K 9/00805; G06K 9/00798; G06K 9/00825; G06K 9/00785; G06K 9/00818;
(Continued)

(56) References Cited

U.S. PATENT DOCUMENTS

| | | | |
|---|---|---|---|
| 2012/0019655 A1* | 1/2012 | Fukamachi | ............. G06T 7/215 348/142 |
| 2012/0101692 A1* | 4/2012 | Kasaba | .................... B60Q 1/10 701/49 |
| 2013/0120578 A1* | 5/2013 | Iga | ..................... B62D 15/0295 348/148 |

FOREIGN PATENT DOCUMENTS

| | | | |
|---|---|---|---|
| JP | 8244746 A | * | 4/1998 |
| JP | H10-091893 A | | 4/1998 |

(Continued)

OTHER PUBLICATIONS

Dec. 12, 2017 International Search Report issued in Application No. PCT/JP2017/037661.

*Primary Examiner* — Quan M Hua
(74) *Attorney, Agent, or Firm* — Oliff PLC

(57) ABSTRACT

Obstacle determination systems and programs detect back-and-forth steering that is behavior of a vehicle for avoiding an obstacle. The systems and programs determine that the obstacle is present between a point where the back-and-forth steering has started and a point where the back-and-forth steering has ended when a steering start road and a steering end road are identical roads. The steering start road is a road where the vehicle is present at a start of the back-and-forth
(Continued)

steering. The steering end road is a road where the vehicle is present at an end of the back-and-forth steering.

3 Claims, 4 Drawing Sheets

(51) Int. Cl.
*G06K 9/00* (2006.01)
*G08G 1/09* (2006.01)
*G08G 1/00* (2006.01)
*G08G 1/16* (2006.01)

(58) Field of Classification Search
CPC .. G06K 9/00791; G06K 9/20; G06K 2209/23; G06K 9/00268; G06K 9/00369; G06K 9/00812; G06K 9/00845; G06K 9/3233; G06K 9/46; G05D 1/0088; G05D 2201/0213; G05D 1/0257; G05D 1/0274; G05D 1/0061; G05D 1/0231
See application file for complete search history.

(56) References Cited

FOREIGN PATENT DOCUMENTS

| | | | |
|---|---|---|---|
| JP | 2008-234044 | A | 10/2008 |
| JP | 4845783 | B2 * | 10/2008 |
| JP | 2016-039751 | A | 3/2016 |

* cited by examiner

Case of LE = LS

Case of LE ≠ LC ≠ LS

Case of LE = LC ≠ LS

Case of LE = LC ≠ LS

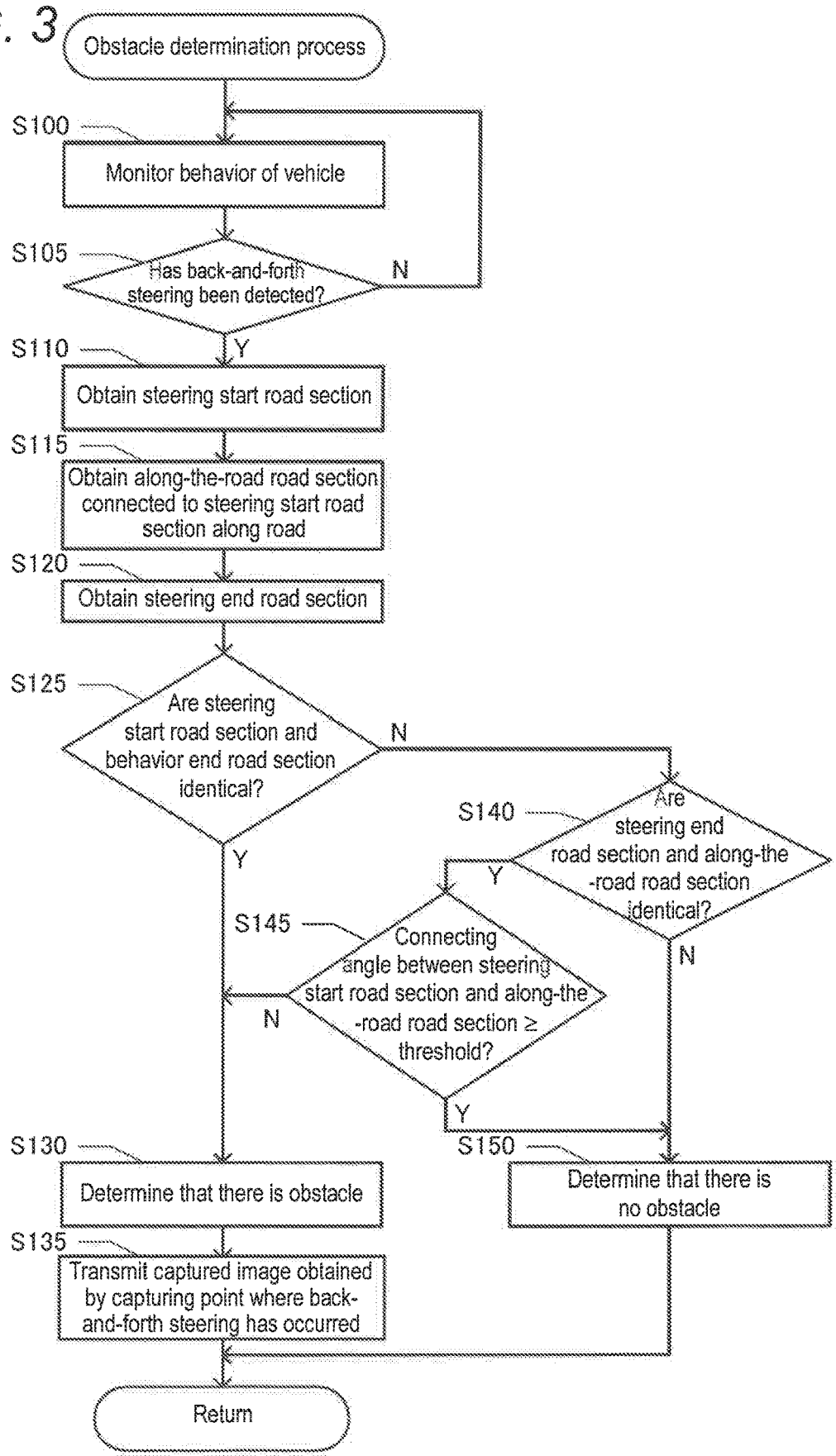

| | | | | |
|---|---|---|---|---|
| Condition 1 | The amount of increase in the absolute value of the steering angle | ≥ | Abrupt steering threshold | A point where the condition has been met is a start point (S) of back-and-forth steering |
| Condition 2 | The amount of increase in the absolute value of the steering angle after condition 1 has been met | ≥ | Abrupt steering threshold/2 | A point where the condition has been met is an end point (E) of the back-and-forth steering |
| Condition 3 | The steering direction of condition 1 and the steering direction of condition 2 | = | Opposite directions | |
| Condition 4 | A distance L from the point where condition 1 has been met to the point where condition 2 has been met | ≤ | Reference distance | |
| Condition 5 | An average vehicle speed for a period from when condition 1 has been met to when condition 2 has been met | ≤ | Reference vehicle speed | |

FIG. 4

OBSTACLE DETERMINATION SYSTEM AND OBSTACLE DETERMINATION PROGRAM

TECHNICAL FIELD

The technical field relates to obstacle determination systems and an obstacle determination programs.

BACKGROUND

There is known a technique for determining, based on behavior of a vehicle, whether the vehicle has encountered an obstacle (see JP 2008-234044 A). In JP 2008-234044 A, when there is an abrupt steering wheel operation, it is determined that the vehicle has encountered an obstacle.

SUMMARY

However, behavior of the vehicle performed in a scene other than avoiding an obstacle is sometimes similar to behavior of the vehicle performed when avoiding an obstacle, and thus, there has been a problem that despite the fact that there is no obstacle, it is erroneously determined that there is an obstacle. For example, since behavior performed when avoiding an obstacle to the left is similar to behavior performed when making a left turn, there has been a case in which though only a left turn has been made, it is erroneously determined that there is an obstacle.

Exemplary embodiments of the broad inventive principles described herein provide a technique for reducing the possibility that left- or right-turn behavior is erroneously determined as behavior for avoiding an obstacle.

Exemplary embodiments provide obstacle determination systems and programs that detect back-and-forth steering that is behavior of a vehicle for avoiding an obstacle. The systems and programs determine that the obstacle is present between a point where the back-and-forth steering has started and a point where the back-and-forth steering has ended when a steering start road and a steering end road are identical roads. The steering start road is a road where the vehicle is present at a start of the back-and-forth steering. The steering end road is a road where the vehicle is present at an end of the back-and-forth steering.

In the above-described configuration, when, at a point in time when back-and-forth steering has ended, the vehicle has moved to a different road than that at a point in time when the back-and-forth steering has started, it is highly likely that a left or right turn has been made at an intersection. As such, when it is highly likely that a left or right turn has been made, it is not determined that there is an obstacle even if there is back-and-forth steering, by which the possibility that left- or right-turn behavior is erroneously determined as behavior for avoiding an obstacle can be reduced.

BRIEF DESCRIPTION OF DRAWINGS

FIG. 3 is a flowchart of an obstacle determination process.

FIG. 4 is a table showing conditions for detecting back-and-forth steering.

DETAILED DESCRIPTION OF EXEMPLARY EMBODIMENTS

Here, an embodiment will be described according to the following order:

(1) Configuration of an obstacle determination system;
(2) Obstacle determination process; and
(3) Other embodiments.

(1) Configuration of an Obstacle Determination System

Figure 1:
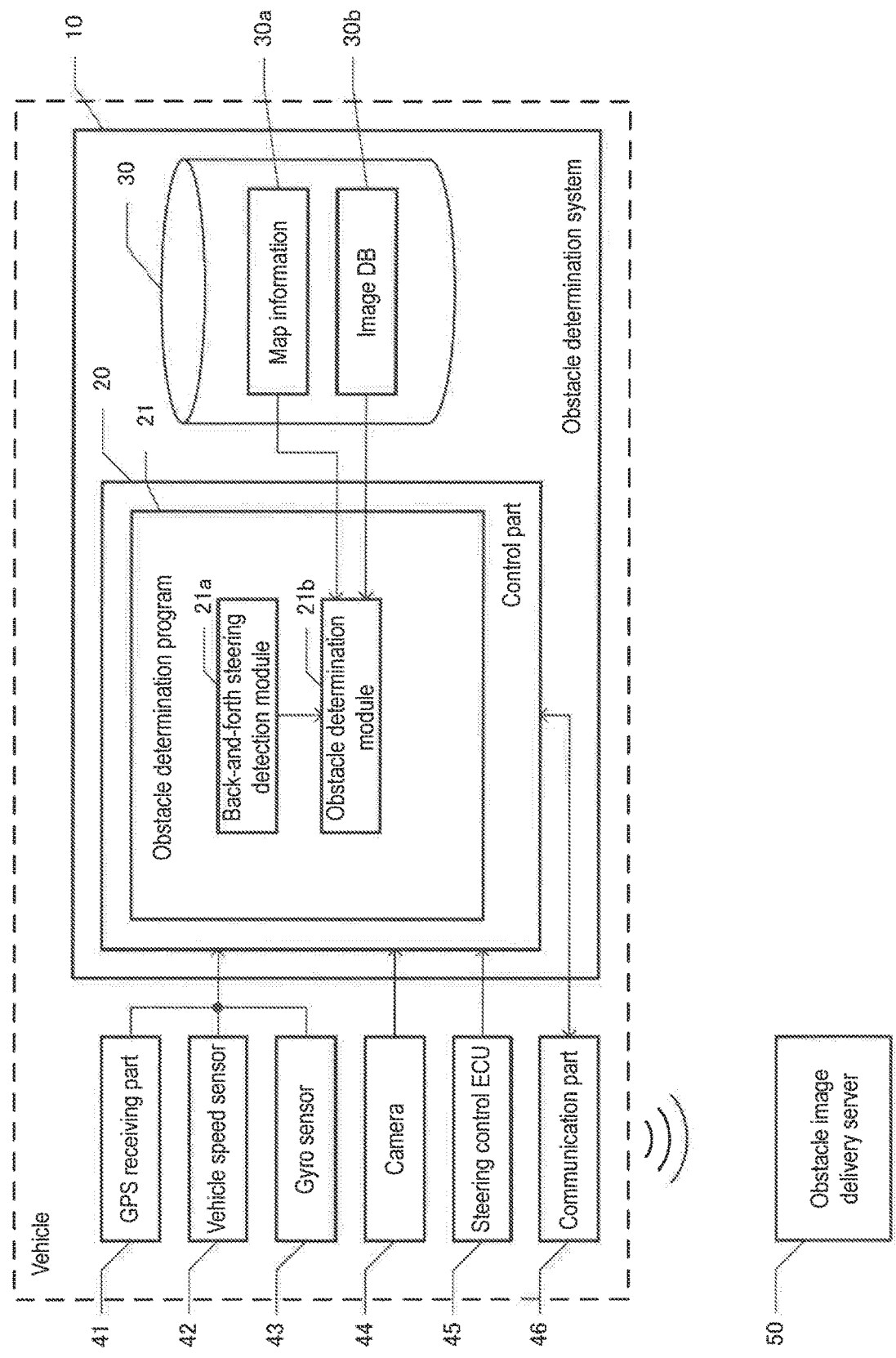
FIG. 1 is a block diagram of an obstacle determination system.

FIG. 1 is a block diagram showing a configuration of an obstacle determination system 10 according to one embodiment. The obstacle determination system 10 is an in-vehicle device included in a vehicle. The obstacle determination system 10 includes a control part 20 and a recording medium 30. The control part 20 includes a CPU, a RAM, a ROM, etc., and executes an obstacle determination program 21 stored in the recording medium 30 or the ROM. (As used herein, the term "recording medium" does not encompass transitory signals.)

The recording medium 30 has map information 30a and an image DB (Database) 30b recorded therein. The map information 30a includes node data, link data, and region information. The node data mainly represents information about an intersection. Specifically, the node data represents the coordinates of a node corresponding to an intersection and the shape of the intersection. The link data represents various types of information such as the number of lanes, width, etc., of a link which is obtained by segmenting a road according to predetermined rules. A portion of the link segmented by consecutive nodes present in a length direction indicates a road section. Note that a node having three or more road sections connected thereto corresponds to an intersection. In addition, the link data defines whether road sections connected at an intersection have an along-the-road relationship. In the present embodiment, it is assumed that when an examiner examines each intersection upon generation of the map information 30a, the examiner defines an along-the-road relationship. For example, it is assumed that, as a general rule, the examiner defines an along-the-road relationship for road sections whose route name or route type (an expressway, a national highway, etc.) does not change even after passing through an intersection, and also defines an along-the-road relationship for road sections whose width or number of lanes does not greatly change even after passing through an intersection.

The link data includes shape interpolation point data. The shape interpolation point data is data representing the coordinates of a shape interpolation point set at the center in a width direction of a road section. The control part 20 obtains the coordinates of nodes and the coordinates of shape interpolation points, and obtains a polyline that connects those coordinates or an approximate curve of those coordinates, as the shape of a link. In addition, the control part 20 obtains the direction of the above-described polyline or approximate curve as the direction of the link.

The image DB 30b is a database that accumulates image data of captured images which are captured by a camera 44 included in the vehicle. In the image DB 30b, a capturing point of a captured image is associated with a capturing time.

The vehicle includes a GPS receiving part 41, a vehicle speed sensor 42, a gyro sensor 43, the camera 44, a steering control ECU (Electronic Control Unit) 45, and a communication part 46. The GPS receiving part 41 receives radio waves from GPS satellites and outputs a signal for calculating a current vehicle location through an interface which is not shown. The vehicle speed sensor 42 outputs a signal corresponding to the rotational speed of wheels included in the vehicle. The control part 20 obtains a vehicle speed based on the signal from the vehicle speed sensor 42. The gyro sensor 43 detects angular acceleration of a turn in a horizontal plane of the vehicle, and outputs a signal corresponding to the orientation of the vehicle. The control part 20 obtains a vehicle's traveling direction based on the signal from the gyro sensor 43. The control part 20 obtains a current vehicle location by identifying a vehicle's travel path based on output signals from the GPS receiving part 41, the vehicle speed sensor 42, the gyro sensor 43, etc. Specifically, the control part 20 identifies a travel link which is a link on which the vehicle is currently traveling, by performing publicly known map matching (a comparison of a travel path and the shape of a link), and corrects a current location so as to approach a location on the travel link.

The camera 44 is a camera that captures a view outside the vehicle, and performs capturing every predetermined time interval (e.g., one second). The control part 20 accumulates image data of captured images which are captured by the camera 44 in the image DB 30b. In addition, the control part 20 records each captured image such that the captured image is associated with the capturing time and capturing point (a current location at the capturing time) of the captured image. The steering control ECU 45 is a computer for controlling the steering angle of drive wheels included in the vehicle. The steering control ECU 45 detects an angle of rotation of a steering wheel operated by a driver, and controls a steering gear box, etc., so as to obtain a steering angle of the drive wheels according to the angle of rotation. The communication part 46 is a communication circuit for implementing wireless communication between the obstacle determination system 10 and an obstacle image delivery server 50. The obstacle image delivery server 50 is a computer that delivers an obstacle image to a vehicle or the like that passes through just before an obstacle Z.

The obstacle determination program 21 includes a back-and-forth steering detection module 21a and an obstacle determination module 21b. The back-and-forth steering detection module 21a and the obstacle determination module 21b are program modules that allow the control part 20 serving as a computer to function as a back-and-forth steering detecting part and an obstacle determining part, respectively.

The back-and-forth steering detection module 21a is a program module for allowing the control part 20 to implement a function of detecting back-and-forth steering which is behavior of the vehicle for avoiding an obstacle. Specifically, by the function of the back-and-forth steering detection module 21a, the control part 20 detects a steering angle, a vehicle speed, and a travel distance as behavior of the vehicle, and when the behavior of the vehicle has satisfied conditions which will be described later, the control part 20 detects back-and-forth steering. Note that the control part 20 detects a steering angle from the steering control ECU 45, detects a vehicle speed based on an output signal from the vehicle speed sensor 42, and detects a travel distance by integrating time-series vehicle speeds.

TABLE 1

| Condition 1. | The amount of increase in the absolute value of the steering angle. | ≥ | Abrupt steering threshold. | A point where the condition has been met is a start point (S) of back-and-forth steering. |
|---|---|---|---|---|
| Condition 2. | The amount of increase in the absolute value of the steering angle after condition 1 has been met. | ≥ | Abrupt steering threshhold2. | A point where the condition has been met in an end point (E) of the back-and-forth steering. |
| Consition 3. | The steering direction of condition 1 and the steering direction of condition 2. | = | Opposite direction. | |
| Condition 4. | A distance L from the point where condition 1 has been met to the point where condition 2 has been met. | ≤ | Reference distance. | |
| Condition 5. | An average vehicle speed for a period from when condition 1 has been met to when condition 2 has been met. | ≤ | Reference vehicle speed. | |

Figure 2A:
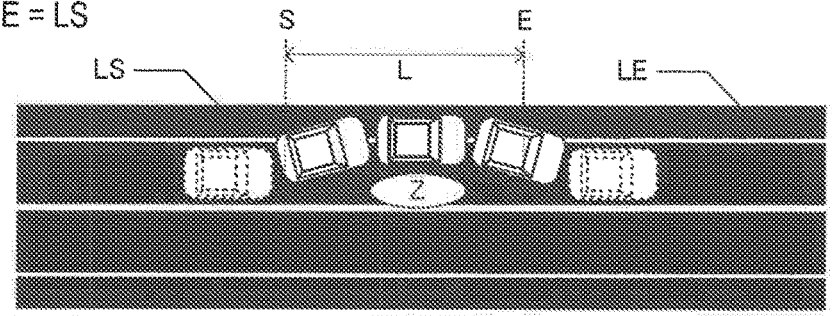
FIGS. 2A and 2C to 2E are plan views of roads.

FIG. 4 is a table showing conditions for detecting back-and-forth steering. In addition, FIG. 2A is a plan view of a road for describing back-and-forth steering. FIG. 2A schematically shows, by solid lines, the states of a vehicle at a plurality of times during back-and-forth steering (the same also applies to FIGS. 2C to 2E which will be described later). When all conditions 1 to 5 shown in the table of FIG. 4 have been met, it indicates that back-and-forth steering has been detected. Condition 1 is that the amount of increase in the absolute value of the steering angle becomes greater than or equal to a predetermined abrupt steering threshold.

Figure 2B:
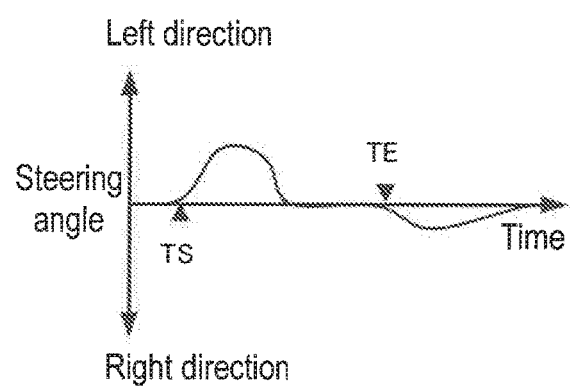
FIG. 2B is a graph of a steering angle.

FIG. 2B is a graph of the steering angle. A vertical axis of FIG. 2B represents steering angle and a horizontal axis represents time. As shown in FIG. 2B, it is assumed that the steering angle is 0 when the vehicle goes straight ahead, and is positive when the steering direction is a left direction, and is negative when the steering direction is a right direction. The amount of increase in the absolute value of the steering angle refers to the magnitude of the steering angle increased per unit time. Here, meeting condition 1 indicates that more abrupt steering than a certain standard has been performed.

Condition 2 is that the amount of increase in the absolute value of the steering angle after condition 1 has been met becomes ½ or more of the abrupt steering threshold. That is, meeting condition 2 indicates that after abrupt steering of condition 1 is performed, somewhat abrupt steering has been performed, though not as abrupt as the abrupt steering of condition 1.

Condition 3 is that the steering direction of condition 1 and the steering direction of condition 2 are opposite directions. That is, meeting condition 2 indicates that after performing more abrupt steering than a certain standard, somewhat abrupt steering direction has been performed in an opposite direction, i.e., abrupt back-and-forth steering has been performed. Here, a current vehicle location for when condition 1 has been met is represented as a start point S of back-and-forth steering, and a current vehicle location for when condition 2 has been met is represented as an end point E of the back-and-forth steering. In addition, a time at which condition 1 has been met is represented as a start time TS of back-and-forth steering of condition 2, and a time at which condition 2 has been met is represented as an end time TE of the back-and-forth steering.

Condition 4 is that a distance L from a point where condition 1 has been met (start point S) to a point where condition 2 has been met (end point E) is less than or equal to a predetermined reference distance (e.g., 50 m). That is, meeting condition 4 indicates that abrupt back-and-forth steering has been performed in a shorter distance than a certain standard.

Condition 5 is that an average vehicle speed for a period from when condition 1 has been met to when condition 2 has been met is less than or equal to a predetermined reference vehicle speed (e.g., 20 km/hour). That is, meeting condition 5 indicates that abrupt back-and-forth steering has been performed at a lower vehicle speed than a certain standard.

An example of FIGS. 2A and 2B shows back-and-forth steering in which first the vehicle performs abrupt steering in the left direction and then passes through the left side of an obstacle Z while traveling forward, and then performs steering in the right direction, and thereby avoids the obstacle Z. Though not shown, when back-and-forth steering in which the vehicle avoids the obstacle Z in the right direction is performed, too, all conditions 1 to 5 are to be met.

The obstacle determination module 21b is a program module for allowing the control part 20 to implement a function of determining that there is an obstacle Z between a start point S where back-and-forth steering starts and an end point E where the back-and-forth steering ends, when a steering start road which is a road where the vehicle is present at the start of the back-and-forth steering and a steering end road which is a road where the vehicle is present at the end of the back-and-forth steering are identical roads. Specifically, by the function of the obstacle determination module 21b, the control part 20 determines that there is an obstacle Z between a start point S where back-and-forth steering starts and an end point E where the back-and-forth steering ends, when, of road sections obtained by segmenting a road by consecutive intersections present on the road, a steering start road section LS in which the vehicle is present at the start of the back-and-forth steering and a steering end road section LE in which the vehicle is present at the end of the back-and-forth steering are identical.

The steering start road section LS indicates a road section of a link defined in link data in the map information 30a, and the road section is segmented by consecutive intersections (nodes) present in a length direction, and is identified as a travel link at the start time TS of back-and-forth steering. On the other hand, the steering end road section LE indicates a road section of a link defined in link data in the map information 30a, and the road section is segmented by consecutive intersections present in a length direction, and is identified as a travel link at the end time TE of the back-and-forth steering. As described above, a travel link is identified by publicly known map matching. Namely, the steering start road section LS is a travel link at the start point S of back-and-forth steering, and the steering end road section LE is a travel link at the end point E of the back-and-forth steering.

In the case of FIG. 2A, back-and-forth steering has occurred upon traveling a point where there is no intersection, and the steering start road section LS and the steering end road section LE are identical road sections. In this case, by the function of the obstacle determination module 21b, the control part 20 determines that there is an obstacle Z between the start point S and end point E of the back-and-forth steering.

Figure 2C:
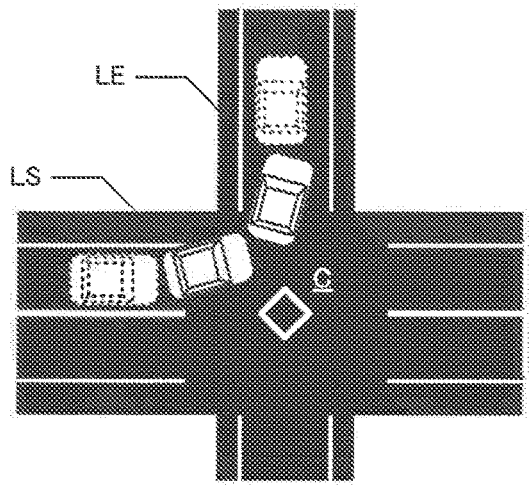

FIG. 2C shows an example in which back-and-forth steering has occurred at an intersection C. In the case of FIG. 2C, back-and-forth steering has occurred at the intersection C, and a steering start road section LS and a steering end road section LE are road sections that are connected at the intersection C and that are not identical. In this case, by the function of the obstacle determination module 21b, the control part 20 does not determine that there is an obstacle Z between the start point S and end point E of the back-and-forth steering.

In addition, by the function of the obstacle determination module 21b, the control part 20 determines that there is an obstacle Z between the start point S and end point E of back-and-forth steering, when a steering start road section LS differs from a steering end road section LE, and the steering start road section LS and the steering end road section LE have an along-the-road relationship. Namely, by the function of the obstacle determination module 21b, the control part 20 determines whether an along-the-road relationship is defined between the steering start road section LS and the steering end road section LE, and if an along-the-road relationship is defined, the control part 20 determines that there is an obstacle Z.

Figure 2D:
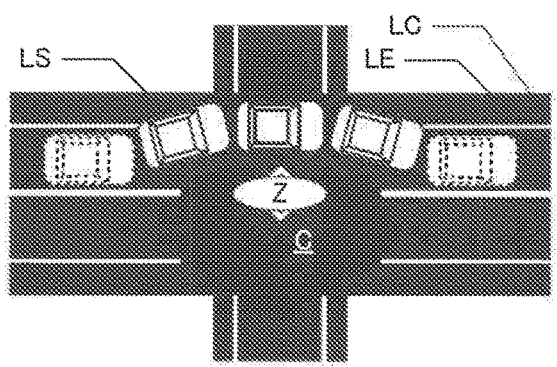

FIG. 2D shows an example in which back-and-forth steering has occurred at an intersection C. In the case of FIG. 2D, back-and-forth steering has occurred at the intersection C, and a steering start road section LS and a steering end road section LE are road sections that are connected at the intersection C and that are not identical. However, the steering start road section LS and the steering end road section LE are road sections on the same route and have an along-the-road relationship. In this case, by the function of the obstacle determination module 21b, the control part 20 determines that there is an obstacle Z between the start point S and end point E of the back-and-forth steering. Note that a road section for which an along-the-road relationship with a steering start road section LS is defined is represented as an along-the-road road section LC.

Figure 2E:
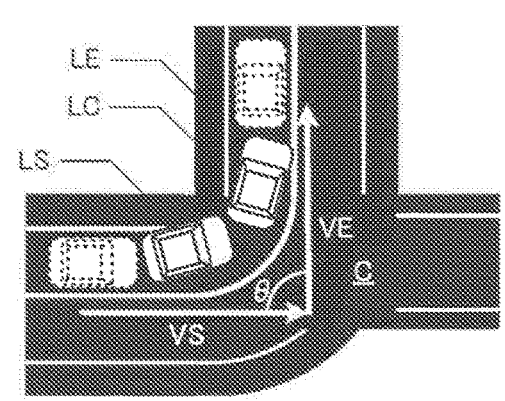

Furthermore, by the function of the obstacle determination module 21b, the control part 20 does not determine that there is an obstacle Z between the start point S and end point E of back-and-forth steering, when, though a steering start road section LS and a steering end road section LE have an along-the-road relationship, a connecting angle between the steering start road section LS and the steering end road section LE is greater than or equal to a threshold (e.g., 30 degrees). On the other hand, by the function of the obstacle determination module 21b, the control part 20 determines that there is an obstacle Z between the start point S and end point E of back-and-forth steering, when a steering start road section LS and a steering end road section LE have an along-the-road relationship and a connecting angle between the steering start road section LS and the steering end road section LE is less than the threshold. Namely, by the function of the obstacle determination module 21b, the control part 20 determines that there is an obstacle Z between the start point S and end point E of back-and-forth steering, when a steering start road section LS differs from a steering end road section LE and a connecting angle between the steering start road section LS and the steering end road section LE is less than the threshold. FIG. 2E shows an example in which back-and-forth steering has occurred at an intersection C. In the case of FIG. 2E, it is assumed that back-and-forth steering has occurred at the intersection C and an along-the-road relationship is defined between a steering start road section LS and a steering end road section LE.

The control part 20 obtains an approach vector VS which is a vector going to the intersection C from a node (other than the intersection C) or a shape interpolation point on the steering start road section LS that is closest to the intersection C to which are connected the steering start road section LS and the steering end road section LE. Furthermore, the control part 20 obtains a leaving vector VE going from the intersection C to a node (other than the intersection C) or a shape interpolation point on the steering end road section LE that is closest to the intersection C. Then, the control part 20 obtains, as a connecting angle θ, a difference of the direction of the leaving vector VE from the direction of the approach vector VS, and determines whether the connecting angle θ is greater than or equal to a threshold. In the case of FIG. 2E, since the connecting angle θ is substantially a right angle, the control part 20 does not determine that there is an obstacle Z between the start point S and end point E of the back-and-forth steering.

In addition, by the function of the obstacle determination module 21*b*, when the control part 20 determines that there is an obstacle Z between the start point S and end point E of back-and-forth steering, the control part 20 transmits a captured image obtained by capturing a point between the start point S and end point E of the back-and-forth steering, to the obstacle image delivery server 50. By the function of the obstacle determination module 21*b*, the control part 20 obtains, from the image DB 30*b*, image data of a captured image captured during a period between the start time TS and end time TE of the vehicle's back-and-forth steering, and transmits the image data to the obstacle image delivery server 50. Note that the capturing time of a captured image to be transmitted does not necessarily need to be between the start time TS and the end time TE. Namely, as long as a captured image is one obtained by capturing a point between the start point S and end point E of back-and-forth steering, the capturing time of a captured image to be transmitted may be adjusted according to an optical axis direction of the camera 44.

In the configuration of the present embodiment described above, when, at a point in time when back-and-forth steering has ended (end time TE), the vehicle has moved to a different road than that at a point in time when the back-and-forth steering has started (start time TS), it is highly likely that a left or right turn has been made at an intersection C. As such, when it is highly likely that a left or right turn has been made, i.e., when a back-and-forth steering start road and a back-and-forth steering end road are not identical, it is not determined that there is an obstacle Z even if there is back-and-forth steering, by which the possibility of an erroneous determination that there is an obstacle Z at a point where a left or right turn has been made can be reduced.

As shown in FIG. 2A, when the steering start road section LS and the steering end road section LE which are segmented by intersections C are identical, it indicates that back-and-forth steering has been detected at a point where there is no intersection C, and thus, it is less likely that a left or right turn has been made. Hence, when the steering start road section LS and the steering end road section LE are identical, it can be securely determined that there is an obstacle Z.

As shown in FIG. 2D, even when the steering start road section LS differs from the steering end road section LE, i.e., even when there is an intersection C near a point where back-and-forth steering has been detected, if the steering start road section LS and the steering end road section LE (along-the-road road section LC) have an along-the-road relationship, it is less likely that a left or right turn has been made (that the steering angle has increased). Hence, when the steering start road section LS and the steering end road section LE have an along-the-road relationship, it can be securely determined that there is an obstacle Z.

As shown in FIG. 2E, even when the steering start road section LS and the steering end road section LE (along-the-road road section LC) have an along-the-road relationship, if the connecting angle θ is large, then the steering angle increases and behavior of the vehicle similar to back-and-forth steering can be detected. As such, when it is highly likely that the steering angle has merely increased simply by traveling along a road, it is not determined that there is an obstacle Z, by which the possibility of an erroneous determination that there is an obstacle Z can be reduced. By the configuration described above, the possibility of an erroneous determination that there is an obstacle Z despite the fact that simply a left or right turn has been merely made can be reduced, and thus, the possibility that unnecessary captured images are transmitted to the obstacle image delivery server 50 can be reduced.

(2) Obstacle Determination Process

Next, an obstacle determination process performed by the function of the obstacle determination program 21 will be described. The obstacle determination process is a process performed at all times when the vehicle travels. Note that during a period during which the obstacle determination process is performed, capturing by the camera 44 and map matching are performed at all times.

First, by the function of the back-and-forth steering detection module 21*a*, the control part 20 monitors behavior of the vehicle (step S100). Namely, during traveling of the vehicle, the control part 20 monitors output signals from the vehicle speed sensor 42 and the steering control ECU 45 at all times so that back-and-forth steering can be detected. Then, by the function of the back-and-forth steering detection module 21*a*, the control part 20 determines whether back-and-forth steering has been detected (step S105). Namely, the control part 20 determines whether all conditions 1 to 5 shown in the table of FIG. 4 have been met.

If it is not determined that back-and-forth steering has been detected (step S105: N), the control part 20 returns to step S100 and continues detection of back-and-forth steering. On the other hand, if it is determined that back-and-forth steering has been detected (step S105: Y), by the function of the obstacle determination module 21*b*, the control part 20 obtains a steering start road section LS (step S110). Namely, the control part 20 obtains a steering start road section LS which is a road section identified as a travel link at a start time TS which is a time at which condition 1 in the table of FIG. 4 has been met.

Then, by the function of the obstacle determination module 21*b*, the control part 20 obtains an along-the-road road section LC which is a road section for which an along-the-road relationship with the steering start road section LS is defined (step S115). The control part 20 obtains an along-the-road road section LC connected to the steering start road section LS along a road at one of intersections at the starting point and endpoint of the steering start road section LS that is closer to a start point S of the back-and-forth steering.

Then, by the function of the obstacle determination module 21*b*, the control part 20 obtains a steering end road section LE (step S120). Namely, the control part 20 obtains a steering end road section LE which is a road section identified as a travel link at an end time TE which is a time at which condition 2 in the table of FIG. 4 has been met.

Then, by the function of the obstacle determination module 21*b*, the control part 20 determines whether the steering end road section LE and the steering start road section LS are identical (step S125). Namely, the control part 20 determines whether the back-and-forth steering has occurred on a single road section and the vehicle has not passed through an intersection upon the back-and-forth steering.

If it is determined that the steering end road section LE and the steering start road section LS are identical (step S125: Y), by the function of the obstacle determination module 21b, the control part 20 determines that there is an obstacle Z (step S130). Namely, since the back-and-forth steering has occurred at a point where there is no intersection C, the control part 20 determines that there is an obstacle Z between the start point S and end point E of the back-and-forth steering (FIG. 2A).

Then, by the function of the obstacle determination module 21b, the control part 20 transmits a captured image obtained by capturing a point where the back-and-forth steering has occurred, to the obstacle image delivery server 50 (step S135). Namely, image data of a captured image in which the obstacle Z is highly likely to be captured is transmitted to the obstacle image delivery server 50.

On the other hand, if it is not determined that the steering end road section LE and the steering start road section LS are identical (step S125: N), by the function of the obstacle determination module 21b, the control part 20 determines whether the steering end road section LE and the along-the-road road section LC (having an along-the-road relationship with the steering start road section LS) are identical (step S140). Namely, the control part 20 determines whether, though the steering start road section LS and the steering end road section LE are not identical, the steering start road section LS and the steering end road section LE have an along-the-road relationship.

If it is not determined that the steering end road section LE and the along-the-road road section LC are identical (step S140: N), by the function of the obstacle determination module 21b, the control part 20 determines that there is no obstacle Z (step S150). Namely, the control part 20 does not determine that there is an obstacle Z between the start point S and end point E of the back-and-forth steering. That is, it is highly likely that at an intersection C where the back-and-forth steering has occurred, the vehicle has turned left or right to the steering end road section LE which is not along the road, and thus, the control part 20 determines that there is no obstacle Z (FIG. 2C).

On the other hand, if it is determined that the steering end road section LE and the along-the-road road section LC are identical (step S140: Y), by the function of the obstacle determination module 21b, the control part 20 determines whether a connecting angle θ between the steering start road section LS and the along-the-road road section LC is greater than or equal to a threshold (step S145). Namely, the control part 20 obtains, as a connecting angle θ, a difference in direction between an approach vector VS in a direction in which the vehicle approaches the intersection C from the steering start road section LS and a leaving vector VE in a direction in which the vehicle leaves for the steering end road section LE from the intersection C, and determines whether the connecting angle θ is greater than or equal to the threshold (FIG. 2E).

If it is not determined that a connecting angle θ between the steering start road section LS and the along-the-road road section LC is greater than or equal to a threshold (step S145: N), by the function of the obstacle determination module 21b, the control part 20 determines that there is an obstacle Z (step S130). Namely, when the control part 20 has detected back-and-forth steering in a situation in which the vehicle does not need to greatly steer along the road, the control part 20 determines that there is an obstacle Z between a start point S at which the back-and-forth steering has started and an end point E at which the back-and-forth steering has ended (FIG. 2D).

On the other hand, if it is determined that a connecting angle θ between the steering start road section LS and the along-the-road road section LC is greater than or equal to a threshold (step S145: Y), by the function of the obstacle determination module 21b, the control part 20 determines that there is no obstacle Z (step S150). Namely, when it is highly likely that back-and-forth steering has been detected when the vehicle has simply greatly steered along the road, the control part 20 does not determine that there is an obstacle Z between a start point S at which the back-and-forth steering has started and an end point E at which the back-and-forth steering has ended (FIG. 2E).

(3) Other Embodiments

Although, in the above-described embodiment, the in-vehicle obstacle determination system 10 has the configuration described above, an in-vehicle device does not necessarily need to have that configuration. For example, by a server communicating with a vehicle, it may be determined whether back-and-forth steering has occurred in the vehicle. In addition, a result of a determination of an obstacle Z does not necessarily need to be used to determine whether to transmit an image. For example, a server may transmit information for calling attention (which does not include a captured image) to a vehicle that travels near where an obstacle Z is present.

Furthermore, there can also be a case in which the map information 30a defines that road sections whose connecting angle θ is less than the threshold have an along-the-road relationship. When such map information 30a is used, the control part 20 may omit a determination process for the connecting angle θ between a steering start road section LS and a steering end road section LE (along-the-road road section LC) (step S145 of FIG. 3). In addition, even if such map information 30a is not used, when there is a margin for a communication band for captured images, etc., the control part 20 may omit a determination process for the connecting angle θ between a steering start road section LS and a steering end road section LE.

Furthermore, regardless of whether there is an along-the-road relationship, when a steering start road section LS and a steering end road section LE are not identical, the control part 20 may not determine that there is an obstacle Z. In addition, a determination as to whether a steering start road and a steering end road are identical does not necessarily need to be made based on the identicalness between a steering start road section LS and a steering end road section LE. For example, the control part 20 may determine, based on node data, whether there is an intersection C in a section in which back-and-forth steering has occurred, and determine that there is an obstacle Z when there is no intersection C. In addition, the control part 20 may determine whether the vehicle is continuously traveling on the same road by capturing views outside the vehicle and performing image recognition on images of the views.

As described above, an obstacle is an object that obstructs passages of vehicles on a road and that is avoided by the vehicles. Behavior of the vehicle may be detected based on a vehicle movement state or may be detected based on a vehicle operating state, or may be detected based on a combination thereof. Back-and-forth steering includes steering in a forward direction in which a traveling direction is changed to a direction in which an obstacle is avoided, and steering in a backward direction in which the traveling direction is changed to a direction taken before avoiding the obstacle. The conditions for determining that there is back-and-forth steering may additionally include the fact that steering in the forward direction and steering in the backward direction are abrupt steering (the amount of change in steering angle per unit time is greater than or equal to a threshold, etc.) or the fact that the time interval between steering in the forward direction and steering in the backward direction is less than or equal to a determination value. Furthermore, the conditions for determining that there is back-and-forth steering may additionally include the fact that at least one of behavior in which the vehicle decelerates so that a traveling direction can be changed to a direction in which an obstacle is avoided, and behavior in which the vehicle accelerates after avoiding the obstacle is detected.

The obstacle determining part determines that there is an obstacle when a steering start road and a steering end road are identical roads, and determines that there is no obstacle when a steering start road and a steering end road are different roads. Furthermore, the obstacle determining part may also determine that there is no obstacle when it is unknown whether a steering start road and a steering end road are identical roads. In addition, the obstacle determining part does not necessarily need to identify a steering start road and a steering end road, and determine whether the steering start road and the steering end road are identical roads, based on the identicalness therebetween. For example, the obstacle determining part may determine that a steering start road and a steering end road are identical roads, by a location where the vehicle is present at the start of back-and-forth steering and by the fact that there is no intersection between a point where the back-and-forth steering has started and a point where the back-and-forth steering has ended.

Furthermore, the obstacle determining part may determine that there is an obstacle between a point where back-and-forth steering has started and a point where the back-and-forth steering has ended, when, of road sections obtained by segmenting a road by consecutive intersections present on the road, a steering start road section in which the vehicle is present at the start of the back-and-forth steering and a steering end road section in which the vehicle is present at the end of the back-and-forth steering are identical. Here, when a steering start road section and a steering end road section which are segmented by intersections are identical, it indicates that back-and-forth steering has been detected at a point where there is no intersection, and thus, it is less likely that a left or right turn has been made. Hence, when a steering start road section and a steering end road section are identical, it can be securely determined that there is an obstacle.

In addition, when a steering start road section differs from a steering end road section and the connecting angle between the steering start road section and the steering end road section is less than the threshold, the obstacle determining part may determine that there is an obstacle between a point where back-and-forth steering has started and a point where the back-and-forth steering has ended. Here, even when the steering start road section differs from the steering end road section, i.e., even when there is an intersection near a point where the back-and-forth steering has been detected, if the connecting angle between the steering start road section and the steering end road section is less than the threshold, it is less likely that a left or right turn has been made (that the steering angle has increased). Hence, when the connecting angle between the steering start road section and the steering end road section is less than the threshold, it can be securely determined that there is an obstacle.

Furthermore, when, though a steering start road section and a steering end road section have an along-the-road relationship, the connecting angle between the steering start road section and the steering end road section is greater than or equal to the threshold, the obstacle determining part may not determine that there is an obstacle between a point where back-and-forth steering has started and a point where the back-and-forth steering has ended. Even when the steering start road section and the steering end road section have an along-the-road relationship, if the connecting angle is large, then the steering angle increases and behavior of the vehicle similar to back-and-forth steering can be detected. As such, when it is highly likely that the steering angle has merely increased simply by traveling along a road, it is not determined that there is an obstacle, by which the possibility of an erroneous determination that there is an obstacle can be reduced. Here, the connecting angle between the steering start road section and the steering end road section indicates the angle of change in traveling direction at an intersection to which are connected the steering start road section and the steering end road section. Namely, the connecting angle between the steering start road section and the steering end road section is an angle indicating how much change is made in the direction of the steering start road section at the intersection with reference to the direction of the steering start road section at the intersection. Here, whether road sections have an along-the-road relationship may be defined in advance in map information. In addition, the obstacle determining part may determine whether road sections have an along-the-road relationship, based on road section information defined in map information. The expression "road sections have an along-the-road relationship" may indicate that the road sections have a common route name or route type (an expressway, a national highway, etc.), or may indicate that the shapes of the road sections are the same or similar. The shapes of the road sections may be the widths of the road sections, or may be the number of lanes the road sections have, or may be the directions of the road sections. The directions of the road sections each may be the direction of a line connecting nodes or shape interpolation points present on the road section.

In addition, the obstacle determining part may transmit an image obtained by capturing a point between a point where back-and-forth steering has started and a point where the back-and-forth steering has ended, to a server when the obstacle determining part determines that there is an obstacle between the point where the back-and-forth steering has started and the point where the back-and-forth steering has ended. By this, the possibility that unnecessary images are transmitted to the server can be reduced.

Furthermore, a technique for determining that there is an obstacle when a road where back-and-forth steering for the obstacle has started and a road where the back-and-forth steering has ended are identical can also be applied as a program or a method. In addition, a system, a program, and a method such as those described above may be implemented as a single apparatus, or may be implemented by using a component shared with each part included in a vehicle, and include various modes. For example, it is possible to provide an obstacle determination system including an apparatus such as that described above, and an obstacle determination system, method, and program. In addition, changes can be made as appropriate, e.g., some are software and some are hardware. Furthermore, the inventive principles may also be realized as a recording medium for a program that controls an apparatus. Of course, the recording medium for software may be a magnetic recording medium or a magneto-optical recording medium, or even any recording medium to be developed in the future can also be considered exactly in the same manner.

The invention claimed is:

1. An obstacle determination system comprising:
a processor programmed to:
    detect back-and-forth steering, the back-and-forth steering being behavior of a vehicle for avoiding an obstacle; and
    determine that the obstacle is present between a first point where the back-and-forth steering has started and a second point where the back-and-forth steering has ended by:
        determining whether, of road sections, a steering start road section where the vehicle is present at a start of the back-and-forth steering is different from a steering end road section where the vehicle is present at an end of the back-and-forth steering;
        determining a connecting angle between the steering start road section and the steering end road section by a calculating an angle between an approach vector having a direction corresponding to the direction of the steering start road section and a leaving vector having a direction corresponding to the direction of the steering end road section;
        determining whether the connecting angle is less than a threshold;
        determining that the obstacle is present between the first point and the second point when (i) the steering start road section is different from the steering end road section, and
        (ii) the connecting angle is less than the threshold.

2. The obstacle determination system according to claim 1, wherein the processor is programmed to transmit an image to a server when it is determined that the obstacle is present between the first point and the second point, the transmitted image being obtained by capturing a point between the first point and the second point.

3. A computer-readable storage medium storing a computer-executable obstacle determination program that causes a computer to perform functions comprising:
    detecting back-and-forth steering, the back-and-forth steering being behavior of a vehicle for avoiding an obstacle; and
    determining that that the obstacle is present between a first point where the back-and-forth steering has started and a second point where the back-and-forth steering has ended by:
        determining whether, of road sections, a steering start road section where the vehicle is present at a start of the back-and-forth steering is different from a steering end road section where the vehicle is present at an end of the back-and-forth steering;
        determining a connecting angle between the steering start road section and the steering end road section by a calculating an angle between an approach vector having a direction corresponding to the direction of the steering start road section and a leaving vector having a direction corresponding to the direction of the steering end road section;
        determining whether the connecting angle is less than a threshold;
        determining that the obstacle is present between the first point and the second point when (i) the steering start road section is different from the steering end road section, and
        (ii) the connecting angle is less than the threshold.

* * * * *